(12) United States Patent
Piveteau et al.

(10) Patent No.: US 11,308,252 B1
(45) Date of Patent: Apr. 19, 2022

(54) FAULT-TOLERANT T-GATES VIA QUASIPROBABILITY DECOMPOSITION

(71) Applicant: International Business Machines Corporation, Armonk, NY (US)

(72) Inventors: Christophe Piveteau, Zürich (CH); David Sutter, Zürich (CH); Paul Kristan Temme, Ossining, NY (US); Sergey Bravyi, Ossining, NY (US); Jay Michael Gambetta, Yorktown Heights, NY (US); Stefan Woerner, Zürich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/097,652

(22) Filed: Nov. 13, 2020

(51) Int. Cl.
| | |
|---|---|
| *G06F 30/3308* | (2020.01) |
| *G06F 119/10* | (2020.01) |
| *G06F 30/39* | (2020.01) |
| *G06N 10/00* | (2022.01) |
| *G06F 17/18* | (2006.01) |

(52) U.S. Cl.
CPC .......... *G06F 30/3308* (2020.01); *G06F 17/18* (2013.01); *G06F 30/39* (2020.01); *G06N 10/00* (2019.01); *G06F 2119/10* (2020.01)

(58) Field of Classification Search
USPC ...................................................... 716/101
See application file for complete search history.

(56) References Cited

U.S. PATENT DOCUMENTS

2021/0272003 A1* 9/2021 Rigetti .................... G06F 9/544

OTHER PUBLICATIONS

Temme et al., "Error Mitigation for Short-Depth Quantum Circuits" Physical Review Letters 119, 180509 (2017).
Aharonov et al., "Fault-tolerant quantum computation with constant error rate". Siam J. Comput., 38(4): 1207{1282, 2008. DOI: 10.1137/S0097539799359385.
Bravyi et al., "Improved classical simulation of quantum circuits dominated by Clifford gates". Phys. Rev. Lett., 116:250501, 2016. DOI: 10.1103/PhysRevLett.116.250501.
Bravyi et al., "Universal quantum computation with ideal clifford gates and noisy ancillas". Phys. Rev. A, 71:022316, 2005. DOI: 10.1103/PhysRevA.71.022316.
Eastin et al., "Restrictions on transversal encoded quantum gate sets". Phys. Rev. Lett., 102:110502, 2009. DOI: 10.1103/PhysRevLett. 102.110502.

(Continued)

*Primary Examiner* — Bryce M Aisaka
(74) *Attorney, Agent, or Firm* — Amin, Turocy & Watson, LLP

(57) ABSTRACT

Techniques that combine quantum error correction and quantum error mitigation are used to simulate a fault-tolerant T-gate with low sampling overhead using the quasiprobability decomposition method. In some embodiments, the T-gate can be simulated using two logical bits and a magic state preparation that mitigates the need for magic state distillation and consequently has a low sampling overhead. Alternatively, the T-gate can be simulated based on code deformation performed on the surface code. Noise is removed from the T-gate using quasiprobability decomposition based on a learned logical error rate.

20 Claims, 12 Drawing Sheets

(56) References Cited

OTHER PUBLICATIONS

Kitaev et al., Anyons in an exactly solved model and beyond. Annals of Physics, 321(1):2 { 111, 2006. DOI: https://doi.org/10.1016/j.aop.2005.10.005. January Special Issue.
Li. "A magic state's delity can be superior to the operations that created it". New Journal of Physics, 17(2):023037, 2015. DOI: 10.1088/1367-2630/17/2/023037.
Lodyga et al., "Simple scheme for encoding and decoding a qubit in unknown state for various topological codes". Scientific Reports, 5(1):8975, 2015. DOI: 10.1038/srep08975.

\* cited by examiner

FAULT-TOLERANT T-GATES VIA QUASIPROBABILITY DECOMPOSITION

BACKGROUND

The subject disclosure relates to quantum computing, and more specifically, to techniques for facilitating error mitigation in quantum computing devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate error mitigation for quantum computing devices are described.

According to an embodiment, a system can comprise a simulation component that simulates an encoded T-gate using a logical qubit encoded into an error correcting code and at least one of a magic state or code deformation of surface code; and a correction component that corrects noise on the encoded T-gate using quasiprobability decomposition.

According to another embodiment, a computer-implemented method can comprise simulating, by the system, an encoded T-gate using a logical qubit encoded into an error correcting code and at least one of a magic state or code deformation of surface code; and correcting, by the system, noise on the encoded T-gate using quasiprobability decomposition.

According to another embodiment, a computer program product can comprise a computer readable storage medium having program instructions embodied therewith. The program instructions are executable by a processor to cause the processor to simulate, by the processor, an encoded T-gate using a logical qubit encoded into an error correcting code and at least one of a magic state or code deformation of surface code; and correct, by the processor, noise on the encoded T-gate using quasiprobability decomposition.

DETAILED DESCRIPTION

Figure 1:
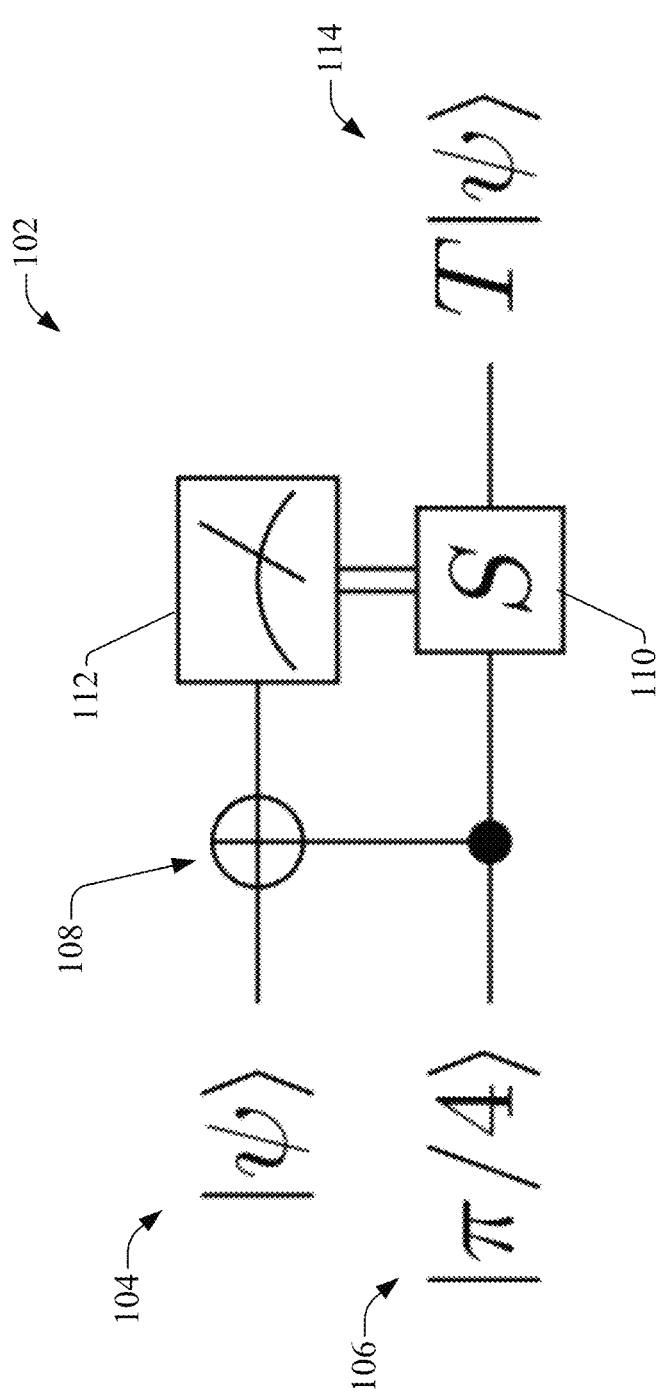
FIG. 1 illustrates an example, non-limiting implementation of a T-gate using a magic state and only Clifford operations.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Classical computers operate on binary digits (or bits) that store or represent information as binary states to perform computing and information processing functions. In contrast, quantum computing devices operate on quantum bits (or qubits) that store or represent information as both the binary states and superpositions of the binary states. To that end, quantum computing devices utilize quantum-mechanical phenomena, such as entanglement and interference.

A quantum computation uses a qubit as its essential unit instead of a classical computing bit. The qubit (e.g., quantum binary digit) is the quantum-mechanical analog of the classical bit. Whereas classical bits can employ on only one of two basis states (e.g., 0 or 1), qubits can employ on superpositions of those basis states (e.g., $\alpha|0\rangle + \beta|1\rangle$, where $\alpha$ and $\beta$ are complex scalars such that $|\alpha|^2 + |\beta|^2 = 1$), allowing a number of qubits to theoretically hold exponentially more information than a same number of classical bits. Thus, quantum computers (e.g., computers that employ qubits instead of or in addition to classical bits) can, in theory, quickly solve problems that can be extremely difficult for classical computers. Since bits of a classical computer are simply binary digits having values of either 0 or 1, almost any device with two distinct states can serve to represent a classical bit; e.g., a switch, a valve, a magnet, a coin, or other such two-state devices. Qubits, partaking of the quantum mystique, can occupy a superposition of 0 and 1 states. This is not the same as having an intermediate value between 0 and 1. When the state of the qubit is measured, the result is either 0 or 1. However, in the course of a computation, a qubit can act as if it represents a mixture of the two states; e.g., 63% 0 and 37% 1.

General quantum programs coordinate quantum and classical parts of a computation. In thinking about general quantum programs, it is instructive to identify processes and abstractions involved in specifying a quantum algorithm, transforming the algorithm into executable form, running an experiment or simulation, and analyzing the results. These processes rely on intermediate representations of a computation. An intermediate representation (IR) is neither its source language description nor the target machine instructions, but something in between. Compilers may use several IRs during a process of translating and optimizing a program. The input to these compilers is source code describing a quantum algorithm and compile time parameters, and the output is a combined quantum/classical program expressed using a high-level IR. In contrast to a classical computer, a quantum computer is probabilistic, and consequently measurements of algorithmic outputs provide a proper solution within an algorithm-specific confidence interval. The computation is then repeated until a satisfactory probable certainty of solution can be achieved.

Quantum computers are able to perform tasks considerably faster than a classical computing device. However, due to the fragile nature of quantum information, quantum computers will be inherently noisy. The theory of quantum error correction and fault-tolerant quantum computing suggests how complicated calculations can be carried out reliably on a faulty device. The threshold theorem ensures that, given the noise level of the physical gates is below some constant threshold value Eth greater than zero, arbitrarily long calculations are possible at arbitrarily low error rates. The cost for a fault-tolerant implementation of a given circuit is a polylogarithmic space overhead. More precisely, to guarantee a final failure probability $\delta$ for a circuit C with |C| locations can entail $O(\log \log(|C|/\delta))$ levels of encoding which results in a $\mathcal{O}(\text{polylog}(|C|/\delta))$ space overhead. Currently, this overhead prevents fault-tolerant quantum computing.

For gates that can be implemented transversally, the fault-tolerant overhead is relatively small, since by definition these gates are fault-tolerant as they do not spread substantial errors. However, the Eastin-Knill theorem indicates that no quantum error correcting code can transversally implement a universal set of gates. In addition, it is known that the set of Clifford gates is transversal for (self-dual) CSS codes, such as the surface code. To obtain a universal set of gates the Clifford gates have to be combined with an additional gate such as the T-gate (a non-Clifford gate) which, according to Eastin-Knill, cannot be implemented transversally for CSS codes.

To implement a fault-tolerant T-gate with little overhead is a non-trivial task. According to one approach, a technique called magic state distillation can be used to fault-tolerantly prepare a magic state with low noise, which then can be transformed into a T-gate with a Clifford circuit. FIG. 1 illustrates an example implementation of a T-gate 102 using a magic state and only Clifford operations. This approach can reduce the problem of implementing a fault-tolerant T-gate (that is, a T-gate capable of carrying out computations reliably even on a faulty device) to the task of preparing fault-tolerant magic states. The latter task can be achieved by magic state distillation, whereby several noisy magic states are transformed into fewer magic states of better fidelity. Whereas magic state distillation is an elegant approach for achieving universal fault-tolerant quantum computing, the magic state distillation process used to obtain a low-noise magic state can lead to a considerable overhead in practice.

To address these and other issues, one or more embodiments described herein are directed to systems and methods for constructing a fault-tolerant T-gate based on the quasiprobability decomposition (QPD) method in a manner that reduces sampling overhead relative to current approaches. These systems and methods can implement a combination of quantum error correction (QEC) and quantum error mitigation (QEM)—e.g., the QPD method to simulate a fault-tolerant T-gate. In some embodiments, the T-gate can be simulated using two logical bits and a magic state preparation that avoids magic state distillation and consequently has a low sampling overhead. Alternatively, the T-gate can be simulated based on code deformation performed on the surface code. This latter approach has a slightly larger sampling overhead relative to the magic state approach, but only utilizes a single logical qubit.

Using quasiprobability decomposition, the fault-tolerant T-gate can be simulated using a tomography step based on twirling, with a sampling overhead that scales roughly as $(1+\varepsilon)t$, where t is the number of T-gates and $\varepsilon$ is the physical error rate. The approach based on code deformation can use subsystem codes, allowing the deformation to be done in software.

Figure 2:
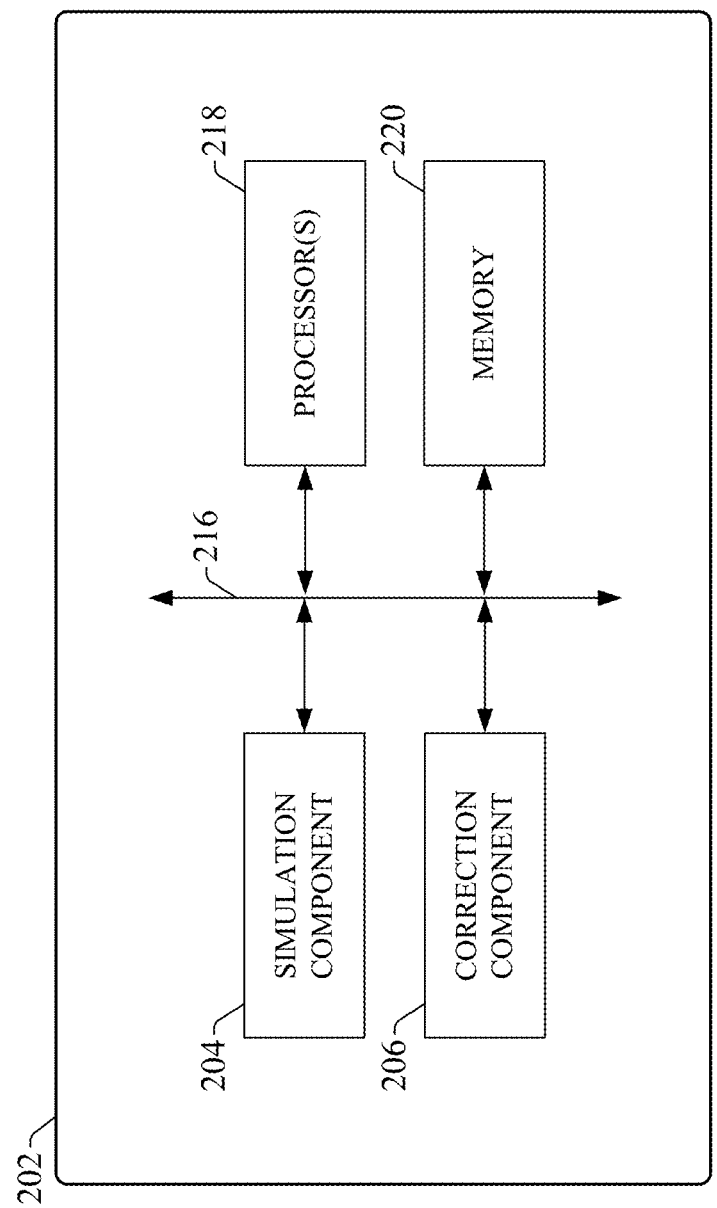
FIG. 2 illustrates a block diagram of an example, non-limiting system that can construct a fault-tolerant T-gate.

FIG. 2 illustrates a block diagram of an example, non-limiting system 200 that can construct a fault-tolerant T-gate, in accordance with one or more embodiments described herein. System 202 includes memory 220 for storing computer-executable components and one or more processors 218 (e.g., one or more classical processors) operably coupled via one or more communication busses 216 to memory 220 for executing the computer-executable components stored in memory 220. As shown in FIG. 2, the computer-executable components include a simulation component 204 and a correction component 206.

Simulation component 204 can simulate a quantum T-gate using at least one of a magic state or code deformation of surface code. Correction component 206 can correct noise on the quantum T-gate using quasiprobability decomposition. In general, the techniques implemented by embodiments of system 202 can simulate a fault-tolerant T-gate with relatively low sampling overhead, in part by eliminating the need to perform magic state distillation since these techniques can yield a fault-tolerant T-gate even if noisy magic states are used.

As noted above, sensitivity to noise and errors can prohibit present day quantum computers from outperforming classical computers in performing computation tasks. Fault tolerance (FT) through quantum error correction (QEC) can provide a long-term solution for mitigating such noise and error sensitivity. However, FT through QEC typically consumes substantial computing resources that are beyond the scope of present-day quantum computers.

Quantum error mitigation (QEM) can offer an intermediate solution for mitigating noise and error sensitivity on near-term quantum computers without the promise of full FT. Quasiprobability decomposition (QPD) is one such QEM technique.

The QPD method can implement, for example, a linear operator $\mathcal{F}$ on n qubits of a quantum computer without error on noisy hardware. More precisely, the quasiprobability method can access a random state that can be sampled independently in every run of the experiment rather than accessing the quantum state $\mathcal{F}(\rho_{in})$ itself (where $\rho_{in}$ is the initial state of the n qubits). This random state exhibits the same expectation values as $\mathcal{F}(\rho_{in})$ for the outcomes of any measurement. However, this comes at a cost in the form of a sampling overhead or C-factor, which is described in terms of the number of additional shots which must be executed.

According to the Gottesman-Knill theorem, any quantum circuit that uses only Clifford gates can be simulated efficiently on a classical computer. To fully leverage the power of quantum computing, quantum computers need to be able to implement a universal set of gates, including non-Clifford gates. However, implementing non-Clifford gates in a fault-tolerant way is cost intensive, since non-Clifford gates cannot be implemented transversally. In some quantum circuits that include non-Clifford gates, 90%-99% of available computing resources are dedicated to the task of achieving fault tolerance (e.g., using magic state distillation).

According to a first step of the approach applied by system 202, a T-gate is implemented (e.g., by simulation component 204). In one or more embodiments, this T-gate can be implemented via a Clifford circuit and the presence of a magic state given by $$|\pi/4\rangle = \frac{1}{\sqrt{2}}(|0\rangle + e^{i\pi/4}|1\rangle) \quad (1)$$

as illustrated in FIG. 1. Since the techniques implemented by system 202 can yield a fault-tolerant T-gate even given a noisy T-gate, the magic state itself can be noisy and can be prepared without magic state distillation. In this example, a noisy magical state represented by $|\pi/4\rangle$ is prepared, and from this a T-gate 102 is implemented transversally using Clifford gates; namely, a controlled not (CNOT) gate 108 and a controlled phase gate 110 (an S-gate in the illustrated example). In the illustrated example, qubit 104 having value ψ is provided to the CNOT gate 108, while the magic state qubit 106 is provided to the controlled phase gate 110. Simulation component 204 can perform a measurement operation 112 on the output of the CNOT gate 108 and provide the measurement result to the controlled phase gate 110. The output 114 of the controlled phase gate 110 represented by $T|\psi\rangle$—serves as the output of the T-gate.

Some noisy state preparation circuits can be designed that prepare a noisy magic state ρ given by $$\rho \approx |\pi/4\rangle\langle\pi/4| \quad (2)$$

such that the logical error rate $$\bar{\varepsilon}:=1- \langle\pi/4|\rho|\pi/4\rangle \quad (3)$$

is upper bounded by a constant that is independent of the code distance. In this case, $\bar{\varepsilon}$ can be in the same order as the physical error rates. For example, assuming $\varepsilon_1$ and $\varepsilon_2$ denote the error probabilities for the one and two qubit gates and $\varepsilon_I$ is the initialization error, for the surface code and a depolarizing error model it can be shown that $$\bar{\varepsilon} = \frac{2}{5}\varepsilon_2 + \frac{2}{3}\varepsilon_1 + 2\varepsilon_I + \mathcal{O}(\varepsilon^2). \quad (4)$$

where $\mathcal{O}$ is the Bachmann-Landau notation.

For simplicity, assume that the chosen code enables a noiseless implementation of logical gates S=diag(1, i), X, CNOT, preparation of logical $|0\rangle$ and $|+\rangle$ states, and measurements of the logical qubit in the Z and X basis. The state ρ can be twirled using the Clifford gate A defined as $$A:=e^{-i\pi/4}SX=|\pi/4\rangle\langle\pi/4|-|0\rangle\langle 0|, \quad (5)$$

where $|0\rangle:=Z|\pi/4\rangle$ is a state orthogonal to $|\pi/4\rangle$. The twirled state thus becomes $$\tau := \frac{1}{2}(\rho + A\rho A) = (1-\bar{\varepsilon})|\pi/4\rangle\langle\pi/4| + \bar{\varepsilon}|0\rangle\langle 0|, \quad (6)$$

where the second equality follows from the identity $$A|\pi/4\rangle\langle 0|A + |\pi/4\rangle\langle 0| = 0. \quad (5)$$

Thus, simulation component 204 can prepare the twirled state i by first preparing ρ and then applying the logical A gate with probability ½. Since $|0\rangle = Z|\pi/4\rangle$, the twirled state i can be considered as the ideal magic state $|\pi/4\rangle$ that suffers from a random Pauli Z error applied with probability $\bar{\varepsilon}$.

Figure 3:
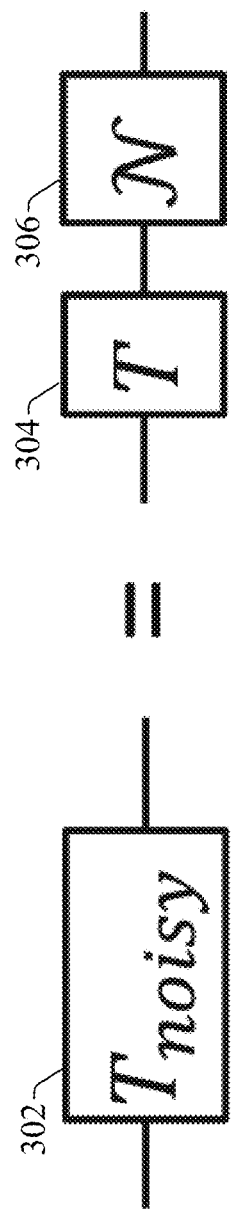
FIG. 3 is a representation of a noisy T-gate, which can be considered equivalent to an ideal T-gate on which noise N is present.

The CNOT gate 108 propagates a Pauli Z error from the magic state $|\pi/4\rangle$ to the data qubit. The error has no effect on the measurement. Thus, using the twirled state τ instead of the ideal magic state $|\pi/4\rangle$ inside the T-gate 102 depicted in FIG. 1, simulation component 204 can implement a noisy T-gate, as given by $$\mathcal{T}_{\bar{\varepsilon}} = (1-\bar{\varepsilon})\mathcal{T} + \bar{\varepsilon}\mathcal{Z} \cdot \mathcal{T} \quad (8)$$

where $\mathcal{T}$ and $\mathcal{Z}$ denote the quantum channels implementing the ideal T and Z-gate, respectively; e.g., T(B)=T BT† and Z(B)=ZBZ† for any single qubit operator B. FIG. 3 is a representation of a noisy T-gate 302, which can be considered equivalent to an ideal T-gate 304 on which noise N 306 is present.

Next, error mitigation techniques can be used to transform the noisy T-gate 302 described by the channel $\mathcal{T}_{\bar{\varepsilon}}$ into a perfect T-gate 304 (without noise N 306) described by the channel $\mathcal{T}$. To do so, correction component 206 can determine a reasonable estimate for the logical error rate $\bar{\varepsilon}$, generate a noise map N based on this logical error rate $\bar{\varepsilon}$, and correct the noise on the noisy T-gate 302 by applying an inverse of the noise map $N^{-1}$ using the QPD method. In some embodiments, the correction component 206 can estimate the logical error rate $\bar{\varepsilon}$ using tomography techniques. Alternatively, some embodiments of correction component 206 can use another method that may more efficiently estimate the logical error rate $\bar{\varepsilon}$ by experimentally measuring $\bar{\varepsilon}$. According to this alternative approach, a phase flip channel is defined as $$\mathcal{N}_{\bar{\varepsilon}} := (1-\bar{\varepsilon})\mathcal{I} + \bar{\varepsilon}\mathcal{Z}, \quad (9)$$

where $\mathcal{I}$ denotes the identity channel. Since $\mathcal{T}$ and $\mathcal{Z}$ commute, then for any p∈ℕ

$$\mathcal{T}_{\bar{\varepsilon}}^p = (\mathcal{N}_{\bar{\varepsilon}} \cdot \mathcal{T})^p = \mathcal{N}_{\bar{\varepsilon}}^p \cdot \mathcal{T}^p. \quad (10)$$

For p≡0 (mod 8)

$$T^p = id \quad (11)$$

and $$\mathcal{T}^p = \mathcal{I}. \quad (12)$$

Hence, equation (10) ensures that $$\mathcal{T}_{\bar{\varepsilon}}^p = \mathcal{N}_{\bar{\varepsilon}}^p \quad (13)$$

Correction component 204 can then determine the logical error rate $\bar{\varepsilon}$ by preparing a logical state $|+\rangle$ fault-tolerantly, applying $\mathcal{T}_{\bar{\varepsilon}}^p$ and measuring the output in the $\{|+\rangle,|-\rangle\}$ basis, which yields an outcome 1 or 0. Simulation component 204 can repeat this circuit multiple times to estimate the expectation value of the outcome, denoted as $$f(p):=\langle +|\mathcal{T}_\varepsilon^p(|+\rangle\langle +|)|+\rangle = \langle +|\mathcal{N}_\varepsilon^p(|+\rangle\langle +|)|+\rangle = \frac{1}{2}(1+(1-2_\varepsilon)^p) \quad (14)$$

where the final step can be checked with a simple iterative argument. By measuring f(p) for p=8, 16, 24, 32, . . . an estimate for $\bar{\varepsilon}$ can be obtained using an exponential fitting.

Once the logical error rate $\bar{\varepsilon}$ is known, the correction component 206 can use various error mitigation techniques to transform the noisy T-gate $\mathcal{T}_{\bar{\varepsilon}}$ into a reasonable approximation of the perfect T-gate $\mathcal{T}$. Two such techniques are discussed below.

Figure 4:
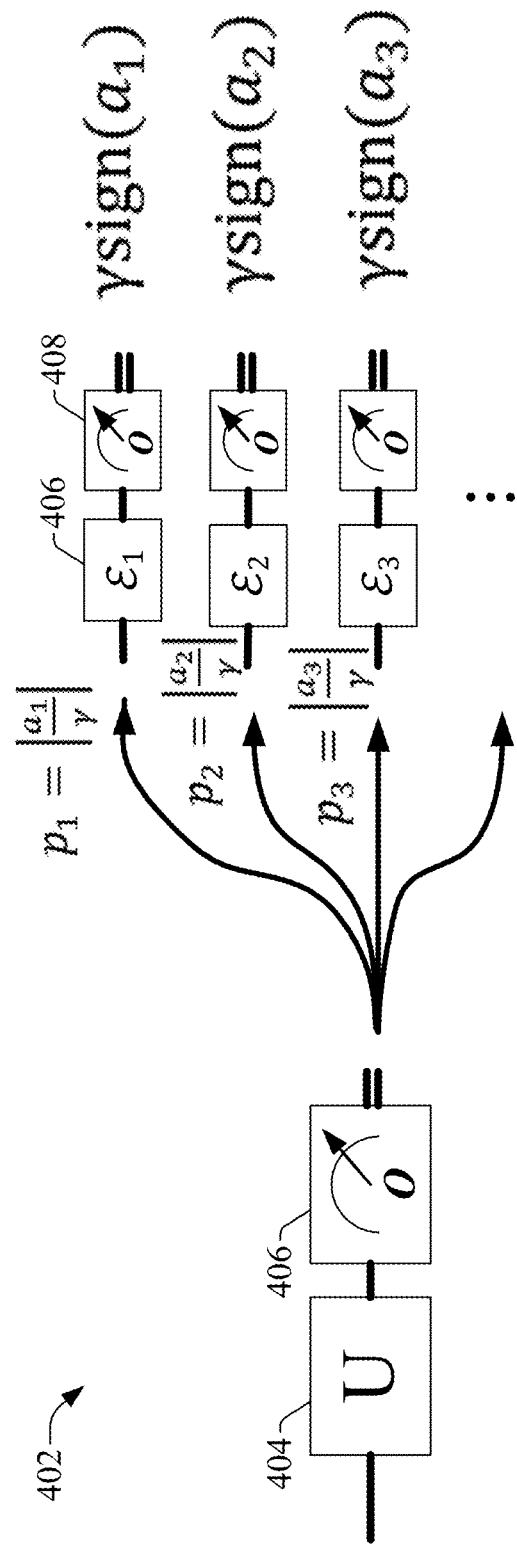
FIG. 4 is a representation of an example, non-limiting circuit illustrating the quasiprobability decomposition method.

The QPD method (sometimes also called probabilistic error cancellation) is a quantum error mitigation technique that allows for the simulation of a desired quantum channel $\mathcal{F}$ (e.g. an ideal quantum gate) while only having access to quantum hardware that can execute noisy quantum channels $\{\varepsilon_i\}$. FIG. 4 is a representation of an example circuit 402 illustrating the QPD method. Assuming a gate U 404 is to be executed and a measurement characterized by the operator O 406 is to be performed, the expected value of this measurement outcome can be represented by $$Tr[O \cdot [U](\rho)] \quad (15)$$

In many quantum circuits, only the expected value is of interest. The QPD method allows this expected value to be estimated even if $[U](\rho)$ cannot be implemented exactly on hardware. According to a first step of the QPD method, if it is assumed that quantum hardware can implement quantum channels $\varepsilon_1, \varepsilon_2, \varepsilon_3, \ldots, \varepsilon_M$, a decomposition given by $$\mathcal{F} = [U](\rho) = \sum_{i=1}^{M} a_i \varepsilon_i \quad (16)$$

is found with some $a_i \in \mathbb{R}$, where $a_i$ is a quasiprobability coefficient and M is a decomposition size. This decomposition can be rewritten as $$[U](\rho) = \gamma \sum_{i=1}^{M} p_i \text{sign}(a_i) \varepsilon_i \quad (17)$$

for $$\gamma = \sum_{i=1}^{M} |a_i| \quad (18)$$

and $$p_i = \left|\frac{a_i}{\gamma}\right| \quad (19)$$

Given this decomposition, each time the quantum circuit is executed, $i \in \{1, \ldots, M\}$ is chosen randomly according to the distribution $p_i$. The gate U 404 is probabilistically replaced by one of the channels $\varepsilon_i$ (block 306) with probability $|a_i|/\gamma$, where $$\gamma := \Sigma_i |a_i| \quad (20)$$

and the measurement outcome (measured at block 408) is weighted with $\gamma \text{sign}(a_i)$.

By correctly weighting the measurement outcome at the end of the circuit, system 202 can obtain an unbiased estimate of the true expectation value of the outcome of the ideal quantum circuit by performing Monte Carlo sampling. The number of samples executed to reach a certain accuracy scales as $\mathcal{O}(\gamma^2)$. In this case, $\gamma$ is the sampling overhead of the QPD method.

Assuming U is a unitary corresponding to the noisy T-gate 302, this method can be utilized by correction component 206 to transform the noisy T-gate $\mathcal{T}_{\bar{\varepsilon}}$ into a perfect T-gate Tin $\mathcal{T}$ in view of the identity $$\mathcal{T} = \left(\frac{1-\bar{\varepsilon}}{1-2\bar{\varepsilon}}\right)\mathcal{T}_{\bar{\varepsilon}} - \left(\frac{\bar{\varepsilon}}{1-2\bar{\varepsilon}}\right)\mathcal{Z} \circ \mathcal{T}_{\bar{\varepsilon}} \quad (21)$$

which yields a QPD of the form of equation (16) with $$\varepsilon_1 = \mathcal{T}_{\bar{\varepsilon}}, \quad (22)$$

$$\varepsilon_2 = \mathcal{Z} \cdot \mathcal{T}_{\bar{\varepsilon}}, \quad (23)$$

$$a_1 = (1-\bar{\varepsilon})/(1-2\bar{\varepsilon}) \quad (24)$$

and $$a_2 = -\bar{\varepsilon}/(1-2\bar{\varepsilon}). \quad (25)$$

In this case, the sampling overhead scales as $$\gamma = |a_1| + |a_2| = \frac{1}{1-2\bar{\varepsilon}} \quad (26)$$

Figure 5:
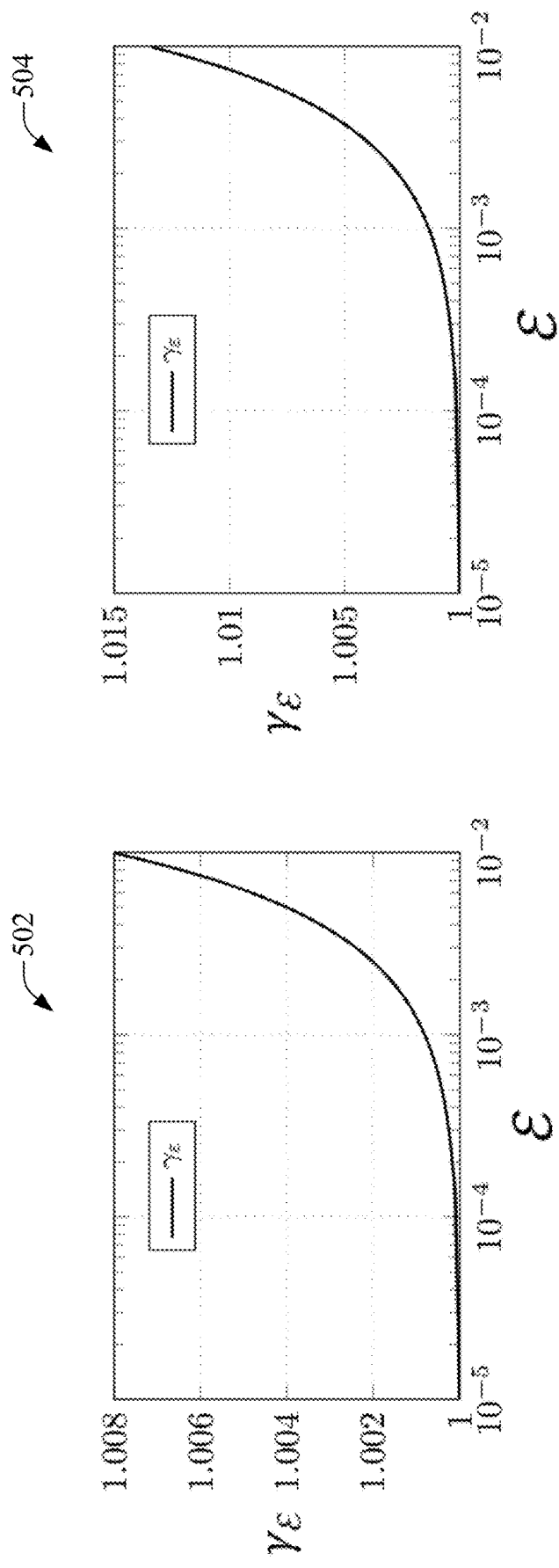
FIG. 5*a* is a plot of sampling overhead $\gamma_\varepsilon$ as a function of physical error rates $\varepsilon$ via a surface encoding T-gate simulation approach for a case in which $\varepsilon_i = \varepsilon_f = 0$ and $\varepsilon_2 = E$.
FIG. 5*b* is a plot of sampling overhead $\gamma\varepsilon$ as a function of physical error rates $\varepsilon$ via a surface encoding T-gate simulation approach for a case in which $\varepsilon_i = \varepsilon_f = \varepsilon_2/10$ and $\varepsilon_2 = \varepsilon$.

FIG. 5a is a plot 502 of the sampling overhead $\gamma_\varepsilon$ given by equation (26) as a function of the physical error rates $\varepsilon$ via the surface encoding described in equation (4) for a case in which $\varepsilon_i = \varepsilon_f = 0$ and $\varepsilon_2 = \varepsilon$. FIG. 5b is a plot 504 of the sampling overhead $\gamma_\varepsilon$ for a case in which $\varepsilon_i = \varepsilon_f = \varepsilon_2/10$ and $\varepsilon_2 = \varepsilon$.

In general, error mitigation using the QPD method can create considerable sampling overhead, which scales as $O(\gamma_\varepsilon^t)$, where t is the T-count. Moreover, combining the QPD method with fault-tolerance can also lead to higher overhead. Consider a setup in which magic state preparation is implemented for a quantum circuit using the quasiprobability method. Under the assumption that the transversal operations are all executed without error, the final circuit would be a quasiprobability mixture given by $$\mathcal{F}^{(ideal)} = \Sigma_k a_k \varepsilon_k^{(ideal)}. \quad (27)$$

However, even transversal operations can incur an error, which can be arbitrarily suppressed. Therefore, the actual final state will be $$\mathcal{F} = \Sigma_k a_k \varepsilon_k \quad (28)$$

where $\varepsilon_k$ includes the effects from noise in the transversal gates.

The error given by $$\|\varepsilon_k - \varepsilon_k^{(ideal)}\| \leq \Delta \quad (29)$$

can be made arbitrarily small by increasing the code distance. By the triangle inequality it can be given that $$\|\mathcal{F} - \mathcal{F}^{(ideal)}\| \leq \Sigma_k |a_k| \|\varepsilon_k - \varepsilon_k^{(ideal)}\| \leq \gamma \Delta = e^t \Delta \quad (30)$$

where t denotes the T-count. Hence, to make the error on the output sufficiently small, $\varepsilon$ can be chosen to be exponentially small in the number of T-gates, such that $\varepsilon = \Delta e - t$. Recalling that in a generic fault-tolerant setting, it can be chosen that $$n = \text{polylog}(1/\varepsilon, |C|) = \text{polylog}(e^t/\Delta, |C|) = \text{poly}(t, \log(1/\Delta), \log(|C|)). \quad (31)$$

In a realistic case in which |C|=poly(t), the code size scales polynomially in the number of locations |C|, instead of polylogarithmically as in the standard fault-tolerant setting. However, recalling that by nature of the QPD method, only circuits in which the sampling overhead γ is sufficiently small are considered. That is, γ≤κ for κ>0 not too large yields ε≥Δ/K and hence $$n=\text{polylog}(1/\varepsilon,|C|) \leq \text{polylog}(\kappa/\Delta,|C|) = \text{poly}(\kappa + \log(1/\Delta, |C|) \approx \text{polylog}(1/\Delta, |C|) \quad (32)$$

where the approximation step is sufficiently precise as long as K is not too large. The scaling matches that expected from the standard fault-tolerant setting.

According to the approach described above, the simulation component 204 simulates a T-gate using magic states (as described above in connection with FIG. 1), and the correction component 206 learns the logical error rate (and corresponding noise map N) on the T-gate and applies QPD to reduce this noise (as described above in connection with FIG. 4). This approach yields a fault-tolerant T-gate even if the prepared magic state is noisy. As such, there is no need to use magic state distillation to prepare the magic state, and consequently the computational overhead is considerably reduced relative to approaches that require magic state distillation to obtain a low-noise magic state.

Figure 6:
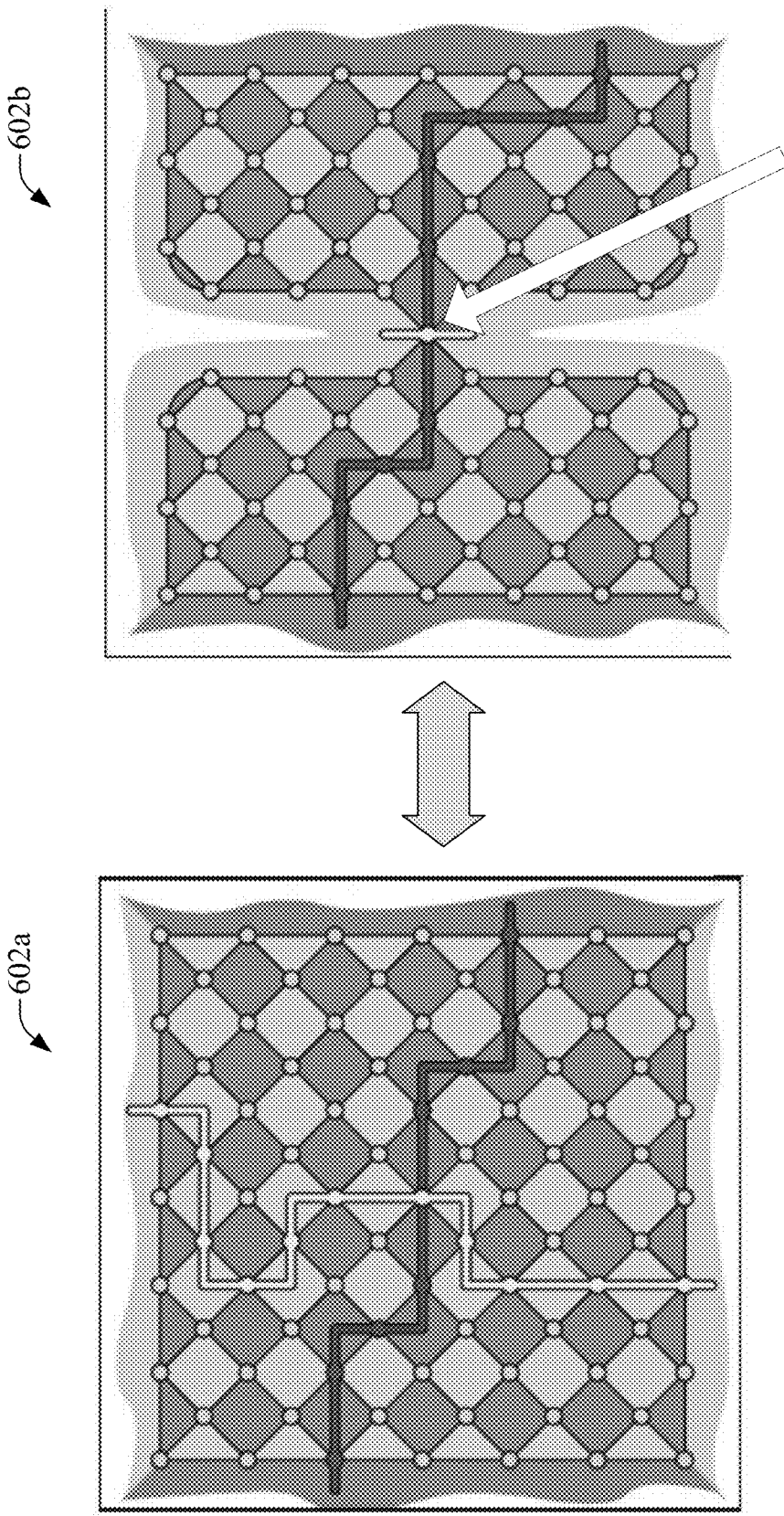
FIG. 6 illustrates implementation of a fault-tolerant T-gate via code deformation.

The magic state approach described above, which can be used by some embodiments of simulation component 204 to simulate the T-gate, utilizes two logical qubits 104 and 106 encoded in error correcting code. As an alternative to this approach, some embodiments of simulation component 204 can use another approach to implement a fault-tolerant T-gate that only utilizes a single logical qubit encoded in the error correcting code. This can reduce the requirements to demonstrate a fault-tolerant T experimentally. This alternative approach is based on code deformation of surface code. FIG. 6 illustrates implementation of a fault-tolerant T-gate via code deformation. According to this approach, code deformation is performed on surface code 602a to exhibit a weight-1 logical Z-operator, a logical T-gate is simulated as a physical T-gate in the resulting deformed code 602b, and the deformed code 602b is then returned to its original form.

Figure 7:
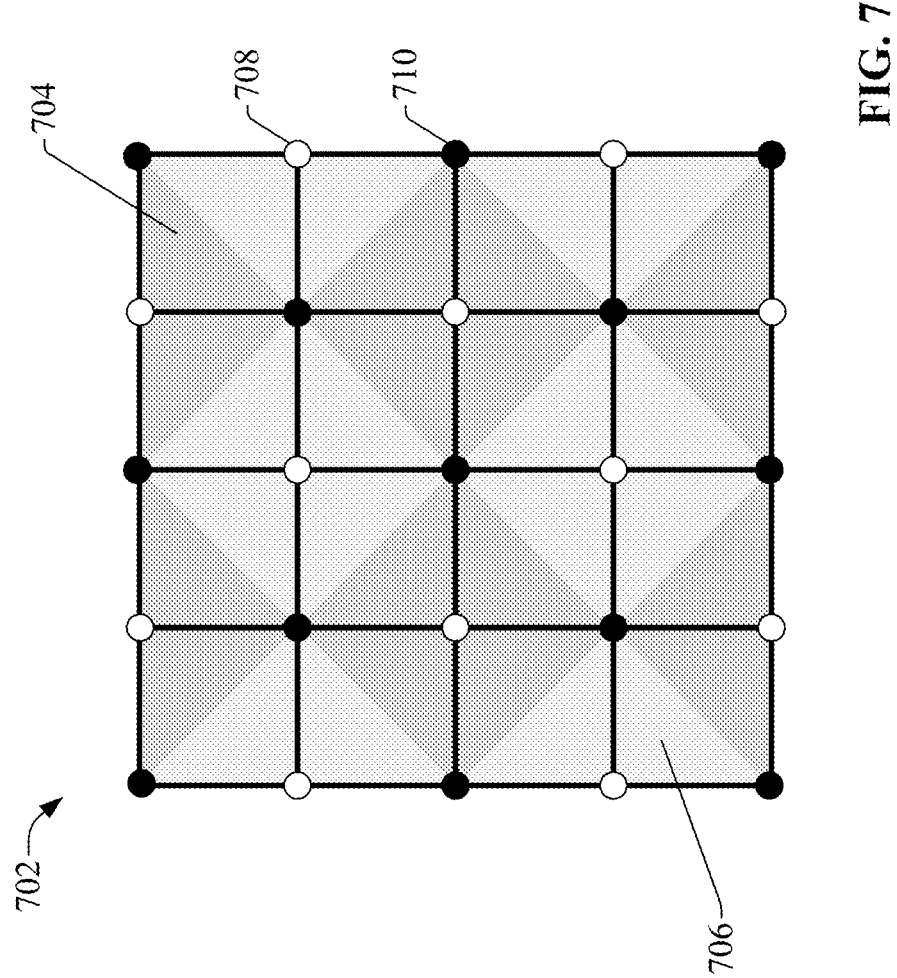
FIG. 7 is a representation of example 5×5 surface code.

FIG. 7 is a representation of example 5×5 surface code 702 of distance d=3, comprising data cubits 710 (the black dots), syndrome qubits 708 (the white dots), Z stabilizers 706, and X stabilizers 704. Thus, surface code 702 uses $4d^2-4d+1$ qubits and has transversal X, Y, Z, S and H gates. However, the approach described herein is essentially independent of which code to be used. In some scenarios it may be beneficial to use other types of codes, such as the rotated or the doubled surface code.

For this noise model for the operations CNOT, MeasX, MeasZ, PrepX, PrepZ and the idle operation a depolarizing channel can be applied on the output cubits of a CNOT in the form of $$A \mapsto \frac{12\varepsilon}{15} A + \frac{\varepsilon}{15} (XAX + ZAZ + YAY) \quad (33)$$

Then, the preparation gates output an orthogonal state to the ideal output with probability ε, and the measurement gates output an incorrect assignment with probability ε. Hence, it can be seen that $$\bar{\varepsilon}_Z = \kappa\varepsilon + \mathcal{O}(d\varepsilon^2) \quad (34)$$

if εd<<1 and $$\bar{\varepsilon}_{\bar{X}} \sim d\left(\frac{\varepsilon}{\varepsilon_{th}}\right)^{d/2} \quad (35)$$

where $\varepsilon_{th}$ denotes the threshold value for the surface code and K denotes a universal constant that is independent of the code size. The assumption εd<<1 is not restrictive in practice given $$d = \text{polylog}(|C|/\varepsilon) \quad (36)$$

in fault-tolerant quantum computing.

Figure 8:
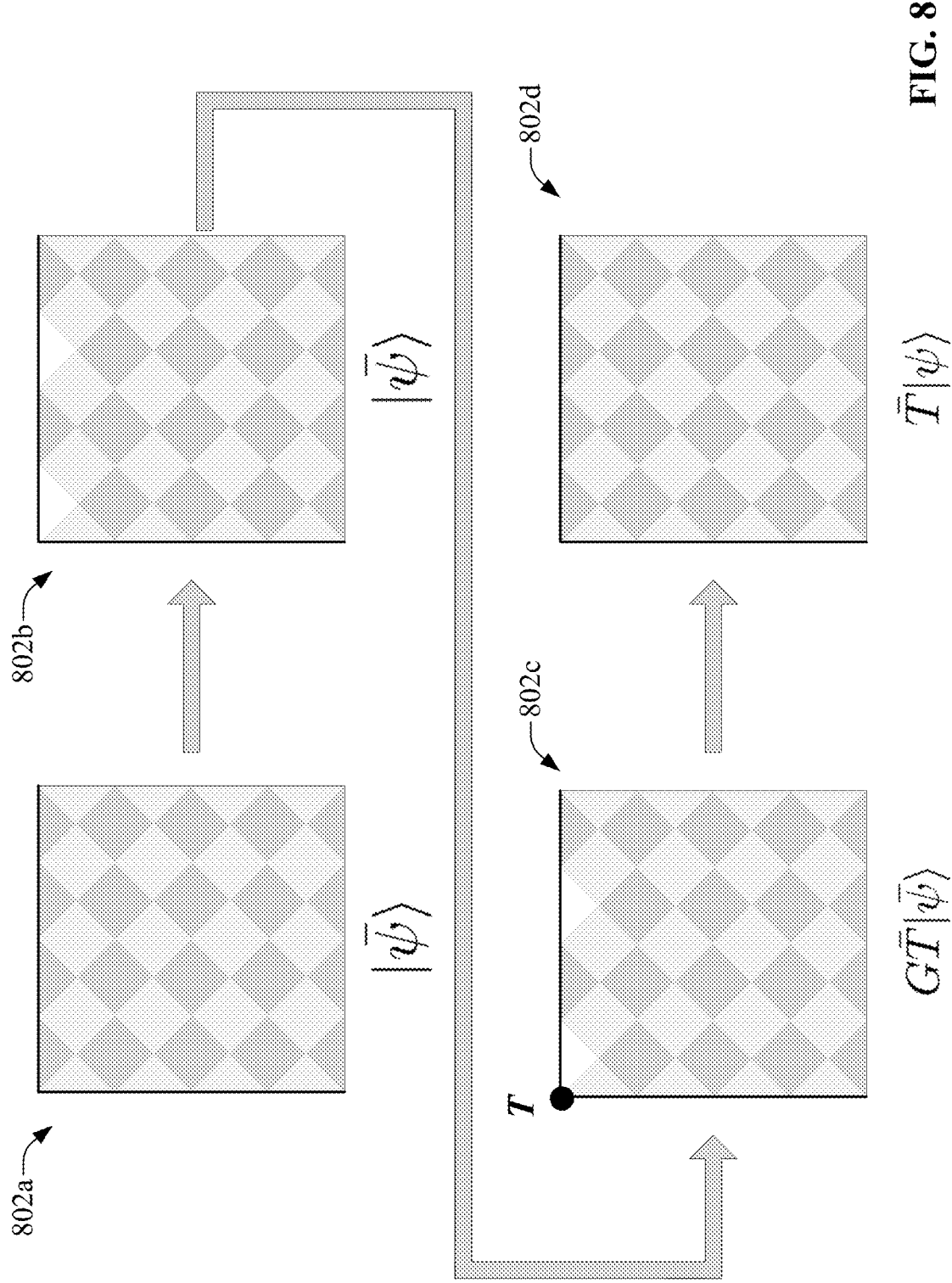
FIG. 8 illustrates an example, non-limiting sequence for implementing a fault-tolerant T-gate using code deformation.

FIG. 8 illustrates an example sequence for implementing a fault-tolerant T-gate using code deformation according to one or more embodiments. This sequence, or another suitable code deformation sequence, can be carried out by the simulation component 204 in one or more embodiments. In this illustrated example, the code deformation performed for 9×9 subsystem surface code of distance d=5. In general, the execution of an encoded T-gate can be simulated via code deformation for surface code of distance d according to the sequence described below.

At step 802a, each physical qubit can be initialized in the |+⟩ state, and d syndrome readout rounds can be performed. This initializes the logical qubit in the |+⟩ state. At step 802b, stabilizers on the top boundary are turned off. A physical T-gate is then applied to the north-west corner at step 802c. Then, at step 802d, stabilizers on the top boundary are turned on, and d syndrome readout rounds are performed. Each physical qubit can then be measured in the X-basis and the error corrected eigenvalue of the logical-X operator can be computed. Logical Z-error can be declared if the measured eigenvalue is −1. For the numerics summarized by FIG. 7, this numerical simulation of K yields κ≈22.

The code deformation approach can be applied in software by hiding one round of measured syndromes on the top boundary from the decoding algorithm. Thus, there is no need to modify the actual syndrome measurement circuit.

By combining quantum error correction with quantum error correction via the QPD method (an approach also referred to as QPD-assisted QEC), embodiments of the system 202 described herein can construct a fault-tolerant T-gate with a relatively small amount of sampling overhead relative to current techniques. When the magic state approach described herein is used to simulate the T-gate, application of the QPD method to revert the effect of noise on the T-gate can yield a fault-tolerant T-gate even when a noisy magic state is used, thereby eliminating the need to perform magic state distillation on the magic state and reducing the sampling overhead accordingly. Alternatively, if the code deformation approach described herein is used, the fault-tolerant T-gate can be simulated using only one logical qubit, rather than two logical qubits as in the magic state approach. Though increasing the sampling overhead relative to the magic state approach, the code deformation approach can still yield a low sampling overhead relative to current approaches. In terms of hardware, QPD-assisted QEC can be implemented using only fault-tolerant T-gates and, in contrast to conventional QEC, does not require a magic state factory since magic state distillation is not necessary.

As in the case of classical simulation, the total simulation time overhead for QPD-assisted QEC scales multiplicatively as a function of the number of T-gates. The cost of the QPD-assisted QEC error mitigation technique is a sampling overhead $\gamma_\varepsilon \geq 1$, which depends on the physical error rate $\varepsilon$ of the basic cates and adds up multiplicatively as a function of the number of T-gates, or the T-count. For a circuit with T-count t, the total sampling overhead is $\gamma_\varepsilon^{2t}$, where $$\lim_{\varepsilon \to o} \gamma_\varepsilon^{2t} = 1. \tag{37}$$

The sampling overhead scales roughly as $\gamma_\varepsilon \approx (1+\varepsilon)$ and is sufficiently small for realistic error rates such that universal fault-tolerant quantum circuits can be simulated for large T-counts on current devices with reasonable sampling overhead.

Figure 9:
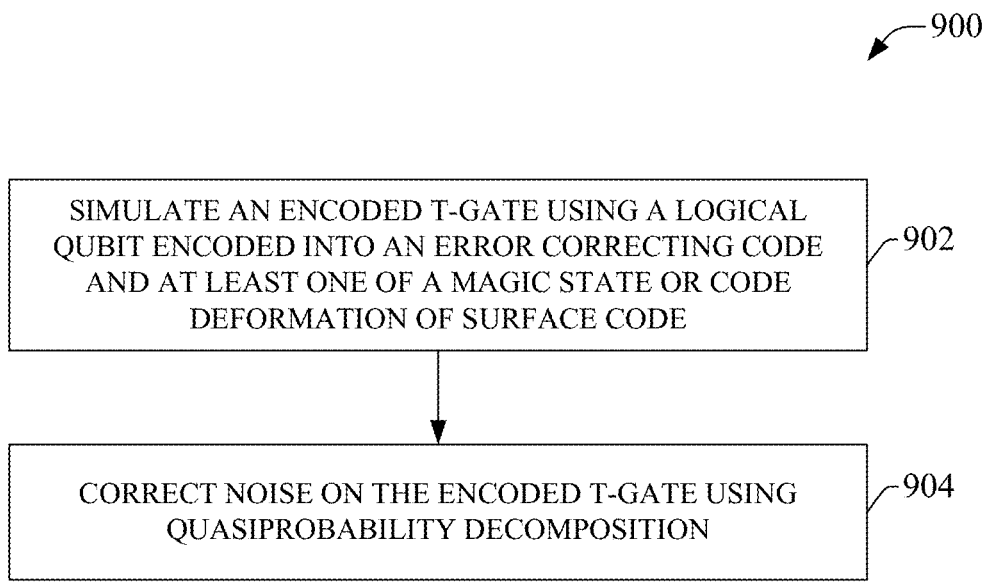
FIG. 9 illustrates a flow diagram of an example, non-limiting computer-implemented method that can create a fault-tolerant T-gate.

FIG. 9 illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 9 illustrates an example methodology 900 for creating a fault-tolerant T-gate according to one or more embodiments described herein. Initially, at 902, an encoded T-gate is simulated (e.g., by simulation component 204) using a logical qubit encoded into an error correcting code and at least one of a magic state or code deformation of surface code or another given code. In some embodiments in which simulation using the magic state is performed, the magic state can be prepared without performing magic state distillation, yielding a noisy magic state. In some embodiments in which simulation via code deformation is performed, the code deformation can be performed on the code to exhibit, for example, a weight–1 logical Z-operator, and the logical T-gate can be simulated as a physical T-gate in the resulting deformed code. At 904, noise is corrected on the encoded T-gate simulated at step 902 using quasiprobability decomposition (e.g., by correction component 204).

Figure 10:
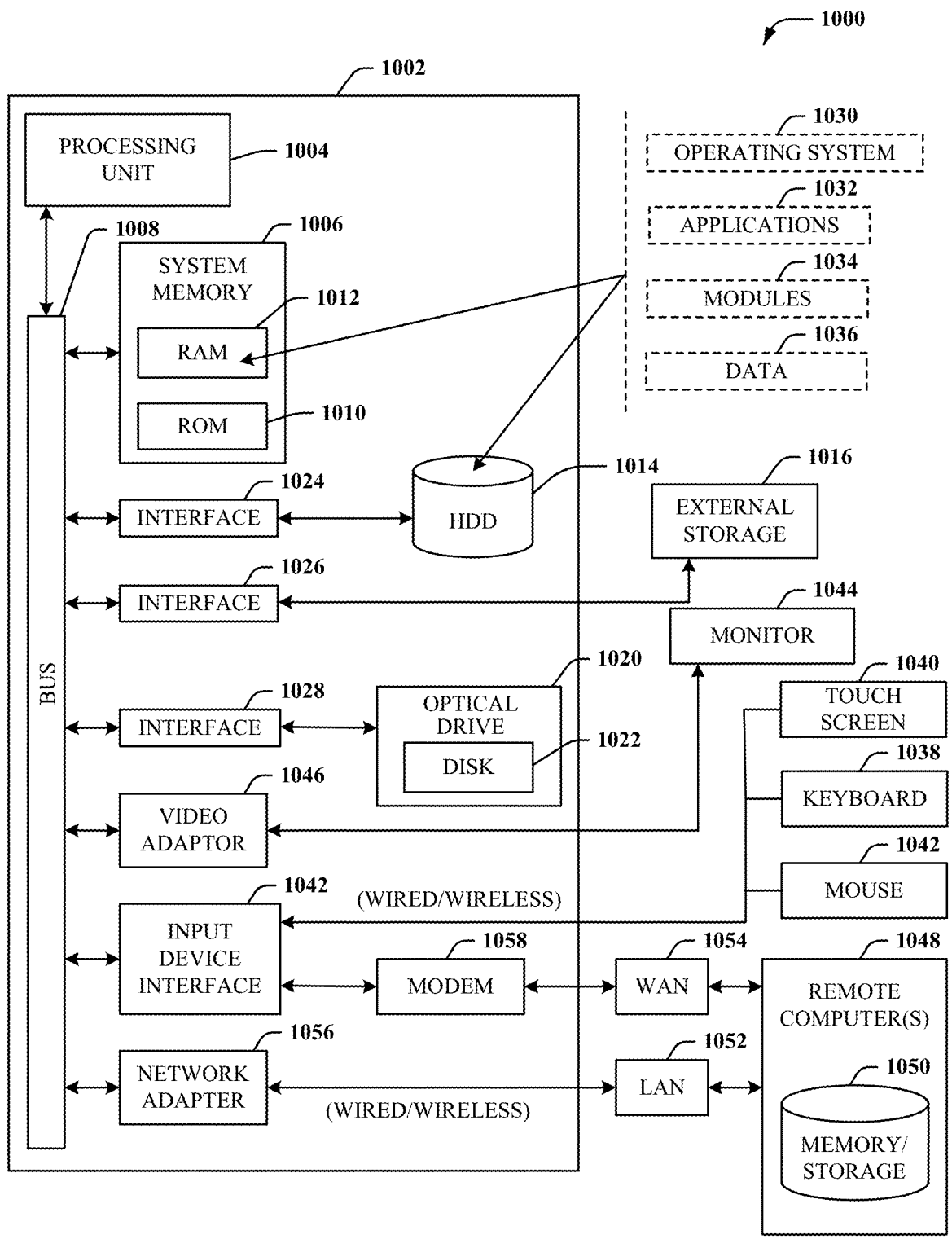
FIG. 10 illustrates a block diagram of an example, non-limiting operating environment in which one or more embodiments described herein can be facilitated.

In order to provide a context for the various aspects of the disclosed subject matter, FIG. 10 as well as the following discussion is intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

With reference to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the adapter 1056 in a wireless mode.

When used in a WAN networking environment, the computer 1002 can include a modem 1058 or can be connected to a communications server on the WAN 1054 via other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1052 or WAN 1054 e.g., by the adapter 1056 or modem 1058, respectively. Upon connecting the computer 1002 to an associated cloud storage system, the external storage interface 1026 can, with the aid of the adapter 1056 and/or modem 1058, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
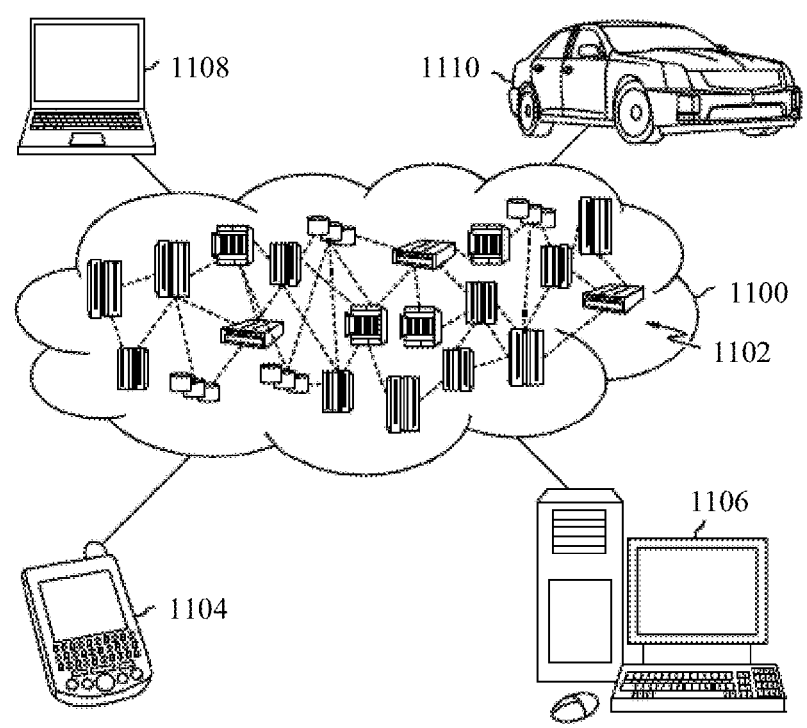
FIG. 11 depicts a cloud computing environment in accordance with one or more embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104-1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
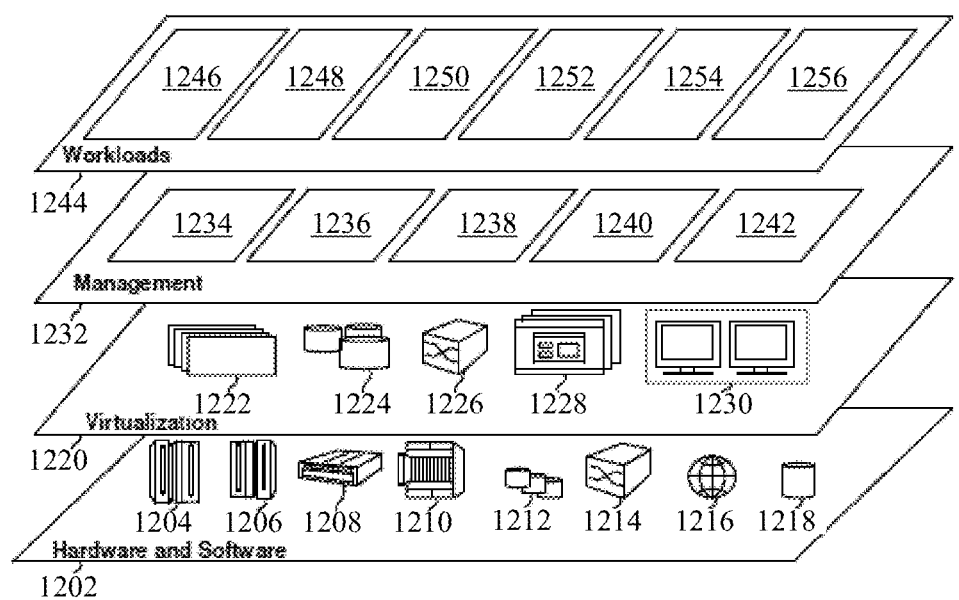
FIG. 12 depicts abstraction model layers in accordance with one or more embodiments described herein.

Referring now to FIG. 12, a set of functional abstraction layers provided by cloud computing environment 1000 (FIG. 11) is shown. Repetitive description of like elements employed in other embodiments described herein is omitted for sake of brevity. It should be understood in advance that the components, layers, and functions shown in FIG. 12 are intended to be illustrative only and embodiments of the invention are not limited thereto. As depicted, the following layers and corresponding functions are provided.

Hardware and software layer 1202 includes hardware and software components. Examples of hardware components include: mainframes 1204; RISC (Reduced Instruction Set Computer) architecture based servers 1206; servers 1208; blade servers 1210; storage devices 1212; and networks and networking components 1214. In some embodiments, software components include network application server software 1216 and database software 1218.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1232 may provide the functions described below. Resource provisioning 1234 provides dynamic procurement of computing resources and other resources that are utilized to perform tasks within the cloud computing environment. Metering and Pricing 1236 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1238 provides access to the cloud computing environment for consumers and system administrators. Service level management 1240 provides cloud computing resource allocation and management such that required service levels are met. Service Level Agreement (SLA) planning and fulfillment 1242 provide pre-arrangement for, and procurement of, cloud computing resources for which a future requirement is anticipated in accordance with an SLA.

Workloads layer 1244 provides examples of functionality for which the cloud computing environment may be utilized. Examples of workloads and functions which may be provided from this layer include: mapping and navigation 1246; software development and lifecycle management 1248; virtual classroom education delivery 1250; data analytics processing 1252; transaction processing 1254; and transfer learning processing 1256. Various embodiments of the present invention can utilize the cloud computing environment described with reference to FIGS. 11 and 12 to determine similarities between a given machine learning task and historical machine learning tasks and perform transfer learning processes on artificial intelligence models generated by automated machine learning based on the determined similarities.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a processor that executes computer-executable components stored in memory, wherein the computer-executable components comprise:
  a simulation component that simulates an encoded T-gate using a logical qubit encoded into an error correcting code and at least one of a magic state or code deformation of surface code; and
  a correction component that corrects noise on the encoded T-gate using quasiprobability decomposition.

2. The system of claim 1,
 wherein the simulation component simulates the encoded T-gate as a quantum circuit comprising Clifford gates and employing two logical qubits; and
 wherein one of the two logical qubits comprises the magic state.

3. The system of claim 2,
 wherein the quantum circuit comprises a controlled not (CNOT) gate and a controlled phase shift gate;
 wherein a first of the two logical qubits comprising the magic state is provided to the controlled phase shift gate and is provided as a control to the CNOT gate;
 wherein a second of the two logical qubits is provided to the CNOT gate; and
 wherein a measurement result of an output of the CNOT gate is provided as a control to the controlled phase shift gate.

4. The system of claim 1, wherein the simulation component simulates the encoded T-gate using the code deformation via:
 performance of a first code deformation on a given code to exhibit a weight–1 logical Z-operator to yield deformed code;
 simulation of a logical T-gate as a physical T-gate in the deformed code; and
 performance of a second code deformation on the deformed code to return the code to its form prior to the performance of the first code deformation.

5. The system of claim 1, wherein the correction component:
 learns an error rate of the encoded T-gate and generates a noise map, N, based on the error rate; and
 corrects the noise on the encoded T-gate by applying an inverse of the noise map, $N^{-1}$, via the quasiprobability decomposition.

6. The system of claim 5, wherein the correction component finds a decomposition for the quasiprobability decomposition according to $$[U](\rho) = \gamma \sum_{i=1}^{M} p_i \operatorname{sign}(a_i) \varepsilon_i$$

where:

$$\gamma = \sum_{i=1}^{M} |a_i|$$

$$p_i = \left| \frac{a_i}{\gamma} \right|$$

U is a unitary corresponding to the encoded T-gate; is
M is a decomposition size;
$a_i$ is a quasiprobability coefficient;
$\varepsilon_i$ is a quantum channel implementable on quantum hardware; and
$\gamma$ is a sampling overhead.

7. The system of claim 6, wherein, for respective executions of a quantum circuit comprising the encoded T-gate, the correction component:
 chooses i randomly according to distribution $p_i$;
 replaces gate U with $\varepsilon_i$; and
 weights a measurement outcome with $\gamma \operatorname{sign}(\alpha_i)$.

8. The system of claim 1, wherein simulation of the encoded T-gate using at least one of the magic state or the code deformation and correction of the noise using quasiprobability decomposition mitigates use of magic state distillation for fault-tolerant simulation of the encoded T-gate.

9. A computer-implemented method, comprising:
 simulating, by a system operatively coupled to a processor, an encoded T-gate using a logical qubit encoded into an error correcting code and at least one of a magic state or code deformation of surface code; and
 correcting, by the system, noise on the encoded T-gate using quasiprobability decomposition.

10. The computer-implemented method of claim 9,
 wherein the simulating comprises simulating the encoded T-gate as a quantum circuit comprising Clifford gates and employing two logical qubits; and
 wherein one of the two logical qubits comprises the magic state.

11. The computer-implemented method of claim 10,
 wherein the quantum circuit comprises a controlled not (CNOT) gate and a controlled phase shift gate;
 wherein a first of the two logical qubits comprising the magic state is provided to the controlled phase shift gate and is provided as a control to the CNOT gate;
 wherein a second of the two logical qubits is provided to the CNOT gate; and
 wherein a measurement result of an output of the CNOT gate is provided as a control to the controlled phase shift gate.

12. The computer-implemented method of claim 9, wherein the simulating the encoded T-gate using the code deformation comprises:
 performing, by the system, a first code deformation on a given code to exhibit a weight–1 logical Z-operator to yield deformed code;
 simulating, by the system, a logical T-gate as a physical T-gate in the deformed code; and
 performing, by the system, a second code deformation on the deformed code to return the code to its form prior to the performing of the first code deformation.

13. The computer-implemented method of claim 9, wherein the correcting comprises:
 learning, by the system, an error rate of the encoded T-gate and generating a noise map, N, based on the error rate; and correcting, by the system, the noise on the encoded T-gate by applying an inverse of the noise map, $N^{-1}$, via the quasiprobability decomposition.

14. The computer-implemented method of claim 13, wherein the correcting comprises finding, by the system, a decomposition for the quasiprobability decomposition according to $$[U](\rho) = \gamma \sum_{i=1}^{M} p_i \text{sign}(a_i) \varepsilon_i$$

where:

$$\gamma = \sum_{i=1}^{M} |a_i|$$

$$p_i = \left|\frac{a_i}{\gamma}\right|$$

U is a unitary corresponding to the encoded T-gate;
M is a decomposition size;
$a_i$ is a quasiprobability coefficient;
$\varepsilon_i$ is a quantum channel implementable on quantum hardware; and
$\gamma$ is a sampling overhead.

15. The computer-implemented method of claim 14, wherein the correcting comprises, for respective executions of a quantum circuit comprising the encoded T-gate:
choosing, by the system, i randomly according to distribution $p_i$;
replacing, by the system, gate U with $\varepsilon_i$; and
weighting, by the system, a measurement outcome with $\gamma \text{sign}(\alpha_i)$.

16. The computer-implemented method of claim 9, wherein the simulating of the encoded T-gate using at least one of the magic state or the code deformation and the correcting of the noise using quasiprobability decomposition mitigates use of magic state distillation for fault-tolerant simulation of the encoded T-gate.

17. A computer program product comprising a computer-readable storage medium having program instructions embodied therewith, the program instructions executable by a processor to cause the processor to:
simulate, by the processor, an encoded T-gate using a logical qubit encoded into an error correcting code and at least one of a magic state or code deformation of surface code; and
correct, by the processor, noise on the encoded T-gate using quasiprobability decomposition.

18. The computer program product of claim 17, wherein the program instructions executable by the processor cause the processor to:
simulate, by the processor, the encoded T-gate as a quantum circuit comprising Clifford gates and employing two logical qubits, wherein one of the two logical qubits comprises the magic state.

19. The computer program product of claim 18,
wherein the quantum circuit comprises a controlled not (CNOT) gate and a controlled phase shift gate;
wherein a first of the two logical qubits comprising the magic state is provided to the controlled phase shift gate and is provided as a control to the CNOT gate;
wherein a second of the two logical qubits is provided to the CNOT gate; and
wherein a measurement result of an output of the CNOT gate is provided as a control to the controlled phase shift gate.

20. The computer program product of claim 17, wherein the program instructions executable by the processor cause the processor to simulate the encoded T-gate using the code deformation via:
performance of a first code deformation on a given code to exhibit a weight-1 logical Z-operator to yield deformed code;
simulation of a logical T-gate as a physical T-gate in the deformed code; and
performance of a second code deformation on the deformed code to return the code to its form prior to the performance of the first code deformation.

* * * * *